(12) United States Patent
Hall et al.

(10) Patent No.: US 10,393,877 B2
(45) Date of Patent: Aug. 27, 2019

(54) MULTIPLE PIXEL SCANNING LIDAR

(71) Applicant: Velodyne Lidar, Inc., Morgan Hill, CA (US)

(72) Inventors: David S. Hall, Los Altos Hills, CA (US); Pieter J. Kerstens, Gilroy, CA (US); Mathew Noel Rekow, Santa Cruz, CA (US); Stephen S. Nestinger, Santa Clara, CA (US)

(73) Assignee: Velodyne Lidar, Inc., Morgan Hill, CA (US)

(*) Notice: Subject to any disclaimer, the term of this patent is extended or adjusted under 35 U.S.C. 154(b) by 71 days.

(21) Appl. No.: 15/610,975

(22) Filed: Jun. 1, 2017

(65) Prior Publication Data

US 2017/0350983 A1    Dec. 7, 2017

Related U.S. Application Data

(60) Provisional application No. 62/344,259, filed on Jun. 1, 2016.

(51) Int. Cl.
| | | |
|---|---|---|
| *G01C 3/08* | (2006.01) |
| *G01S 17/89* | (2006.01) |
| *G01C 1/06* | (2006.01) |
| *G01S 7/481* | (2006.01) |
| *G01S 7/487* | (2006.01) |
| *G01S 17/87* | (2006.01) |
| *G01S 17/10* | (2006.01) |

(52) U.S. Cl.
CPC ............. *G01S 17/89* (2013.01); *G01C 1/06* (2013.01); *G01C 3/08* (2013.01); *G01S 7/487* (2013.01); *G01S 7/4815* (2013.01); *G01S 7/4817* (2013.01); *G01S 17/10* (2013.01); *G01S 17/87* (2013.01)

(58) Field of Classification Search
CPC ...... G01S 17/89; G01S 7/4815; G01S 7/4817; G01S 7/487; G01S 17/10; G01S 17/87; G01C 1/06; G01C 3/08
See application file for complete search history.

(56) References Cited

U.S. PATENT DOCUMENTS

| | | |
|---|---|---|
| 7,969,558 B2 | 6/2011 | Hall |
| 8,675,181 B2 | 3/2014 | Hall |
| 8,767,190 B2 | 7/2014 | Hall |

*Primary Examiner* — Samantha K Abraham
(74) *Attorney, Agent, or Firm* — Perkins Coie LLP

(57) ABSTRACT

Methods and systems for performing three dimensional LIDAR measurements with multiple illumination beams scanned over a three dimensional environment are described herein. In one aspect, illumination light from each LIDAR measurement channel is emitted to the surrounding environment in a different direction by a beam scanning device. The beam scanning device also directs each amount of return measurement light onto a corresponding photodetector. In some embodiments, a beam scanning device includes a scanning mirror rotated in an oscillatory manner about an axis of rotation by an actuator in accordance with command signals generated by a master controller. In some embodiments, the light source and photodetector associated with each LIDAR measurement channel are moved in two dimensions relative to beam shaping optics employed to collimate light emitted from the light source. The relative motion causes the illumination beams to sweep over a range of the three dimensional environment under measurement.

20 Claims, 10 Drawing Sheets

MULTIPLE PIXEL SCANNING LIDAR

CROSS REFERENCE TO RELATED APPLICATION

The present application for patent claims priority under 35 U.S.C. § 119 from U.S. provisional patent application Ser. No. 62/344,259, entitled "Multiple Pixel Scanning LIDAR," filed Jun. 1, 2016, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Improvements in the opto-mechanical design of LIDAR systems are desired, while maintaining high levels of imaging resolution and range.

SUMMARY

Methods and systems for performing three dimensional LIDAR measurements with multiple illumination beams scanned over a three dimensional environment are described herein.

In one aspect, illumination light is directed toward a particular location in the surrounding environment by one or more beam shaping optical elements and a beam scanning device. In a further aspect, the return measurement light is directed and focused onto a photodetector by the beam scanning device and the one or more beam shaping optical elements. The beam scanning device is employed in the optical path between the beam shaping optics and the environment under measurement. The beam scanning device effectively expands the field of view and increases the sampling density within the field of view of the 3-D LIDAR system.

In some embodiments, a 3-D LIDAR system includes a an array of light sources aligned in a plane. Each light source is associated with a different LIDAR measurement channel. The 3-D LIDAR system also includes a beam scanning device including a scanning mirror rotated in an oscillatory manner about an axis of rotation by an actuator in accordance with command signals generated by a master controller. Each beam reflects from the surface of the scanning mirror in a different direction. In this manner, the objects in the environment are interrogated by different beams of illumination light at different locations. The scanning mirror causes the illumination beams to sweep over a range of the three dimensional environment under measurement.

In some other embodiments, the array of light sources is two dimensional, and the two-dimensional field of measurement beams is swept over a range of the three dimensional environment under measurement.

In another aspect, the light source and detector of each LIDAR measurement channel are moved in two dimensions relative to beam shaping optics employed to collimate light emitted from the light source. The two dimensional motion is aligned with the optical plane of the beam shaping optic and effectively expands the field of view and increases the sampling density within the field of view of the 3-D LIDAR system.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
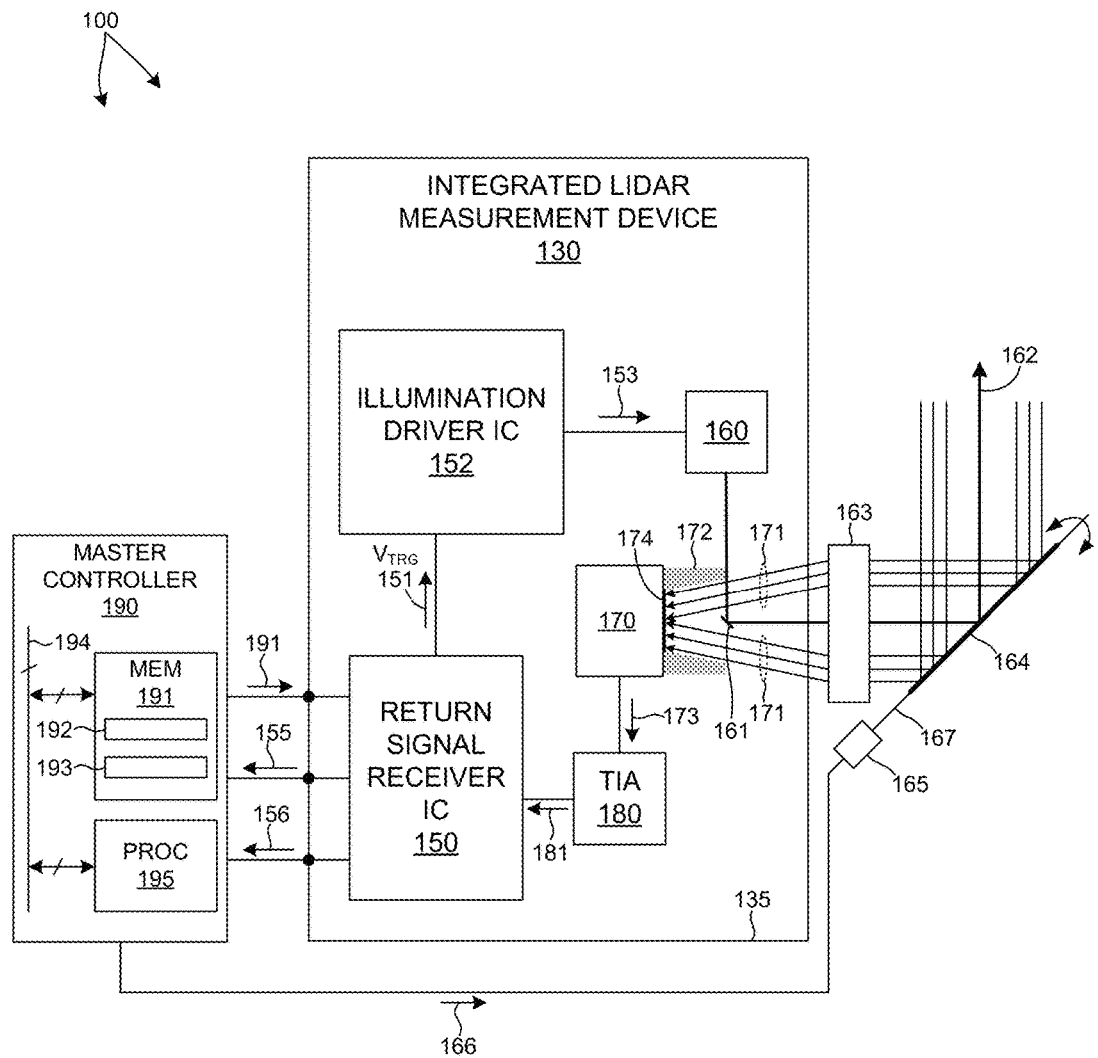
FIG. 1 is a simplified diagram illustrative of one embodiment of a 3-D LIDAR system 100 in at least one novel aspect.

FIG. 1 depicts an LIDAR measurement system 100 in one embodiment. LIDAR measurement system 100 includes a master controller 190 and one or more integrated LIDAR measurement devices 130. An integrated LIDAR measurement device 130 includes a return signal receiver integrated circuit (IC), an illumination driver integrated circuit (IC) 152, an illumination source 160, a photodetector 170, and a trans-impedance amplifier (TIA) 180. Each of these elements is mounted to a common substrate 135 (e.g., printed circuit board) that provides mechanical support and electrical connectivity among the elements.

Illumination source 160 emits a measurement pulse of illumination light 162 in response to a pulse of electrical current 153. In some embodiments, the illumination source 160 is laser based (e.g., laser diode). In some embodiments, the illumination source is based on one or more light emitting diodes. In general, any suitable pulsed illumination source may be contemplated. Illumination light 162 exits LIDAR measurement device 100 and reflects from an object in the surrounding three dimensional environment under measurement. A portion of the reflected light is collected as return measurement light 171 associated with the measurement pulse 162. As depicted in FIG. 1, illumination light 162 emitted from integrated LIDAR measurement device 130 and corresponding return measurement light 171 directed toward integrated LIDAR measurement device share a common optical path.

In one aspect, the illumination light 162 is focused and projected toward a particular location in the surrounding environment by one or more beam shaping optical elements 163 and a beam scanning device 164 of LIDAR measurement system 100. In a further aspect, the return measurement light 171 is directed and focused onto photodetector 170 by beam scanning device 164 and the one or more beam shaping optical elements 163 of LIDAR measurement system 100. The beam scanning device is employed in the optical path between the beam shaping optics and the environment under measurement. The beam scanning device effectively expands the field of view and increases the sampling density within the field of view of the 3-D LIDAR system.

In the embodiment depicted in FIG. 1, beam scanning device 164 is a moveable mirror element that is rotated about an axis of rotation 167 by rotary actuator 165. Command signals 166 generated by master controller 190 are communicated from master controller 190 to rotary actuator 165. In response, rotary actuator 165 scans moveable mirror element 164 in accordance with a desired motion profile.

Integrated LIDAR measurement device 130 includes a photodetector 170 having an active sensor area 174. As depicted in FIG. 1, illumination source 160 is located outside the field of view of the active area 174 of the photodetector. As depicted in FIG. 1, an overmold lens 172 is mounted over the photodetector 170. The overmold lens 172 includes a conical cavity that corresponds with the ray acceptance cone of return light 171. Illumination light 162 from illumination source 160 is injected into the detector reception cone by a fiber waveguide. An optical coupler optically couples illumination source 160 with the fiber waveguide. At the end of the fiber waveguide, a mirror element 161 is oriented at a 45 degree angle with respect to the waveguide to inject the illumination light 162 into the cone of return light 171. In one embodiment, the end faces of fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 162 into the acceptance cone of return light 171 with minimal occlusion.

The placement of the waveguide within the acceptance cone of the return light 171 projected onto the active sensing area 174 of detector 170 is selected to ensure that the illumination spot and the detector field of view have maximum overlap in the far field.

As depicted in FIG. 1, return light 171 reflected from the surrounding environment is detected by photodetector 170. In some embodiments, photodetector 170 is an avalanche photodiode. Photodetector 170 generates an output signal 173 that is amplified by an analog trans-impedance amplifier (TIA) 180. However, in general, the amplification of output signal 173 may include multiple, amplifier stages. In this sense, an analog trans-impedance amplifier is provided by way of non-limiting example, as many other analog signal amplification schemes may be contemplated within the scope of this patent document. Although TIA 180 is depicted in FIG. 1 as a discrete device separate from the receiver IC 150, in general, TIA 180 may be integrated with receiver IC 150. In some embodiments, it is preferable to integrate TIA 180 with receiver IC 150 to save space and reduce signal contamination.

The amplified signal 181 is communicated to return signal receiver IC 150. Receiver IC 150 includes timing circuitry and a time-to-digital converter that estimates the time of flight of the measurement pulse from illumination source 160, to a reflective object in the three dimensional environment, and back to the photodetector 170. A signal 155 indicative of the estimated time of flight is communicated to master controller 190 for further processing and communication to a user of the LIDAR measurement system 100. In addition, return signal receiver IC 150 is configured to digitize segments of the return signal 181 that include peak values (i.e., return pulses), and communicate signals 156 indicative of the digitized segments to master controller 190. In some embodiments, master controller 190 processes these signal segments to identify properties of the detected object. In some embodiments, master controller 190 communicates signals 156 to a user of the LIDAR measurement system 100 for further processing.

Master controller 190 is configured to generate a pulse command signal 191 that is communicated to receiver IC 150 of integrated LIDAR measurement device 130. Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 152 and data acquisition by receiver IC 150. However, illumination driver IC 152 and receiver IC 150 do not share the same clock as master controller 190. For this reason, precise estimation of time of flight becomes much more computationally tedious when the pulse command signal 191 is directly used to trigger pulse generation and data acquisition.

In general, a LIDAR measurement system includes a number of different integrated LIDAR measurement devices 130 each emitting a pulsed beam of illumination light from the LIDAR device into the surrounding environment and measuring return light reflected from objects in the surrounding environment.

In these embodiments, master controller 190 communicates a pulse command signal 191 to each different integrated LIDAR measurement device. In this manner, master controller 190 coordinates the timing of LIDAR measurements performed by any number of integrated LIDAR measurement devices. In a further aspect, beam shaping optical elements 163 and beam scanning device 164 are in the optical path of the illumination pulses and return measurement pulses associated with each of the integrated LIDAR measurement devices. In this manner, beam scanning device 164 directs each illumination pulse and return measurement pulse of LIDAR measurement system 100.

In the depicted embodiment, receiver IC 150 receives pulse command signal 191 and generates a pulse trigger signal, $V_{TRG}$ 151, in response to the pulse command signal 191. Pulse trigger signal 151 is communicated to illumination driver IC 152 and directly triggers illumination driver IC 152 to electrically couple illumination source 160 to power supply 133 and generate a pulse of illumination light 162. In addition, pulse trigger signal 151 directly triggers data acquisition of return signal 181 and associated time of flight calculation. In this manner, pulse trigger signal 151 generated based on the internal clock of receiver IC 150 is employed to trigger both pulse generation and return pulse data acquisition. This ensures precise synchronization of pulse generation and return pulse acquisition which enables precise time of flight calculations by time-to-digital conversion.

Figure 2:
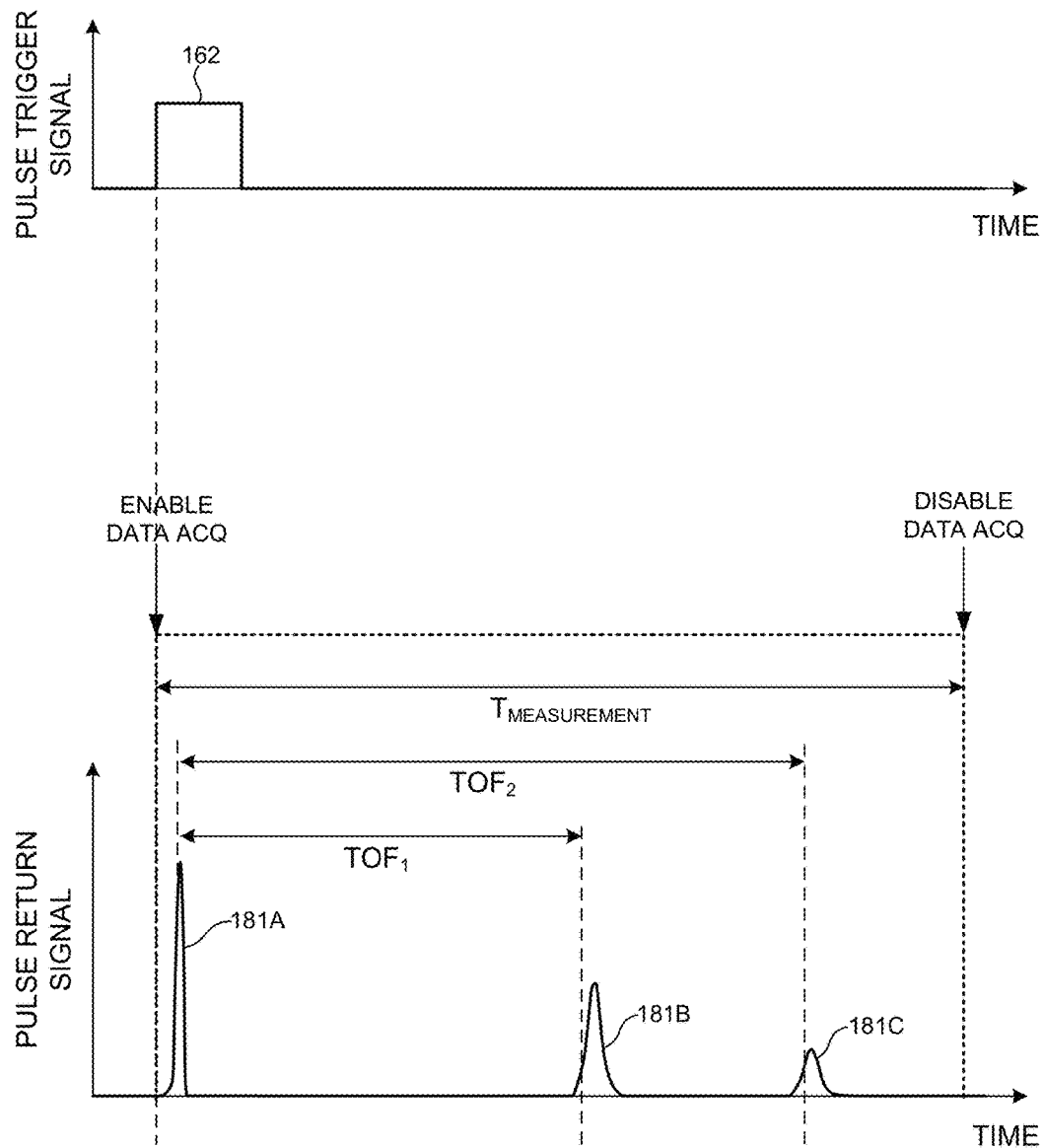
FIG. 2 depicts an illustration of the timing of emission of a pulsed measurement beam and capture of the returning measurement pulse.

FIG. 2 depicts an illustration of the timing associated with the emission of a measurement pulse from an integrated LIDAR measurement device 130 and capture of the returning measurement pulse. As depicted in FIG. 2, a measurement is initiated by the rising edge of pulse trigger signal 162 generated by receiver IC 150. As depicted in FIGS. 1 and 2, an amplified, return signal 181 is received by receiver IC 150. As described hereinbefore, a measurement window (i.e., a period of time over which collected return signal data is associated with a particular measurement pulse) is initiated by enabling data acquisition at the rising edge of pulse trigger signal 162. Receiver IC 150 controls the duration of the measurement window, $T_{measurement}$, to correspond with the window of time when a return signal is expected in response to the emission of a measurement pulse sequence. In some examples, the measurement window is enabled at the rising edge of pulse trigger signal 162 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 181 includes three return measurement pulses that correspond with the emitted measurement pulse. In general, signal detection is performed on all detected measurement pulses. Further signal analysis may be performed to identify the closest valid signal 181B (i.e., first valid instance of the return measurement pulse), the strongest signal, and the furthest valid signal 181C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 162 and each valid return pulse (i.e., 181B and 181C) introduces undesireable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 150 measures time of flight based on the time elapsed between the detection of a detected pulse 181A due to internal cross-talk between the illumination source 160 and photodetector 170 and a valid return pulse (e.g., 181B and 181C). In this manner, systematic delays are eliminated from the estimation of time of flight. Pulse 181A is generated by internal cross-talk with effectively no distance of light propagation. Thus, the delay in time from the rising edge of the pulse trigger signal and the instance of detection of pulse 181A captures all of the systematic delays associated with illumination and signal detection. By measuring the time of flight of valid return pulses (e.g., return pulses 181B and 181C) with reference to detected pulse 181A, all of the systematic delays associated with illumination and signal detection due to internal cross-talk are eliminated. As depicted in FIG. 2, receiver IC 150 estimates the time of flight, $TOF_1$, associated with return pulse 181B and the time of flight, $TOF_2$, associated with return pulse 181C with reference to return pulse 181A.

In some embodiments, the signal analysis is performed by receiver IC 150, entirely. In these embodiments, signals 155 communicated from integrated LIDAR measurement device 130 include an indication of the time of flight determined by receiver IC 150. In some embodiments, signals 156 include digitized segments of return signal 181 generated by receiver IC 150. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

Figure 3:
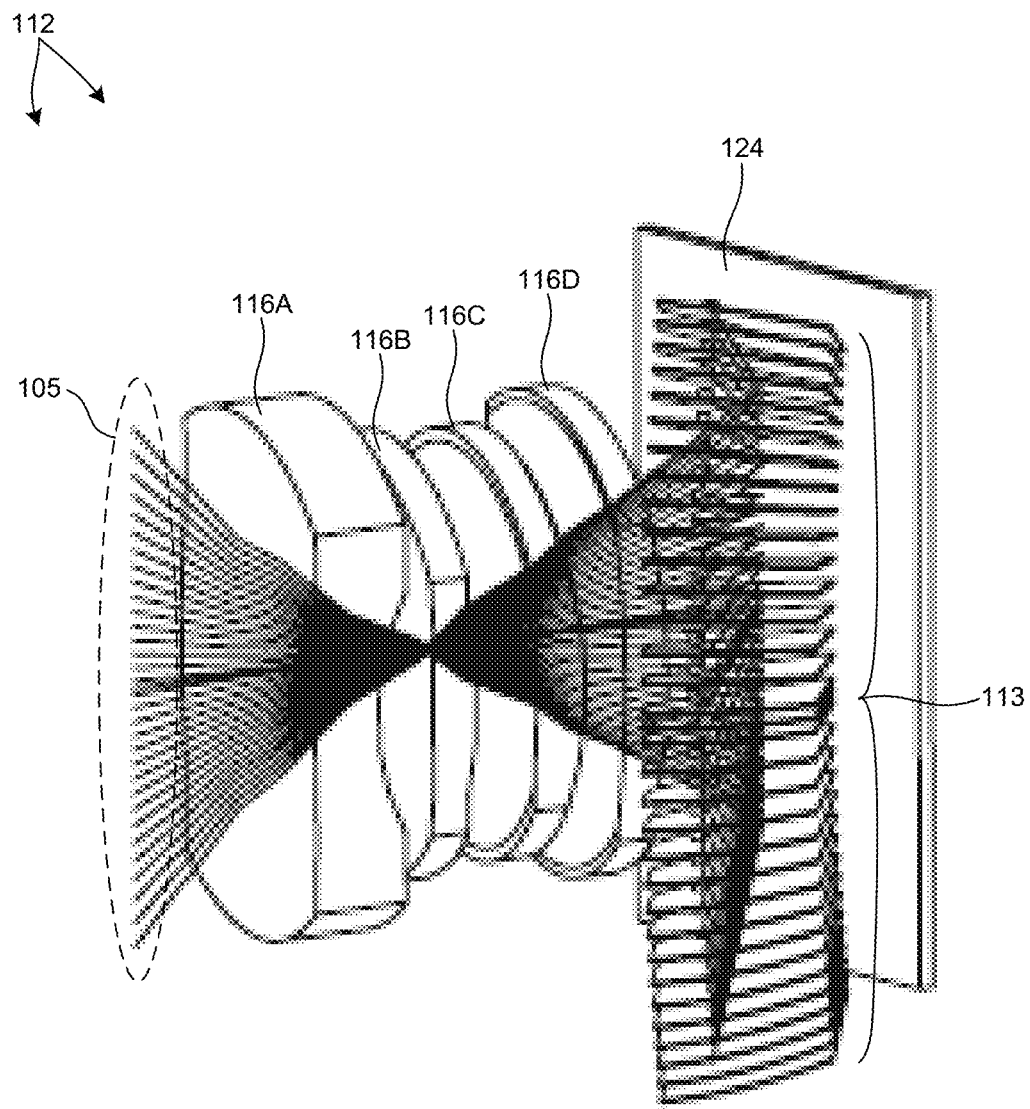
FIG. 3 depicts a view of light emission/collection engine 112 of 3-D LIDAR system 100.

FIG. 3 depicts a light emission/collection engine 112 in one embodiment. Light emission/collection engine 112 includes an array of integrated LIDAR measurement devices 113. Each integrated LIDAR measurement device includes a light emitting element, a light detecting element, and associated control and signal conditioning electronics integrated onto a common substrate (e.g., electrical board).

Light emitted from each integrated LIDAR measurement device passes through beam shaping optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 3. In general, any number of LIDAR measurement devices can be arranged to simultaneously emit any number of light beams from 3-D LIDAR system 100. Light reflected from an object in the environment due to its illumination by a particular LIDAR measurement device is collected by beam shaping optical elements 116. The collected light passes through beam shaping optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 4:
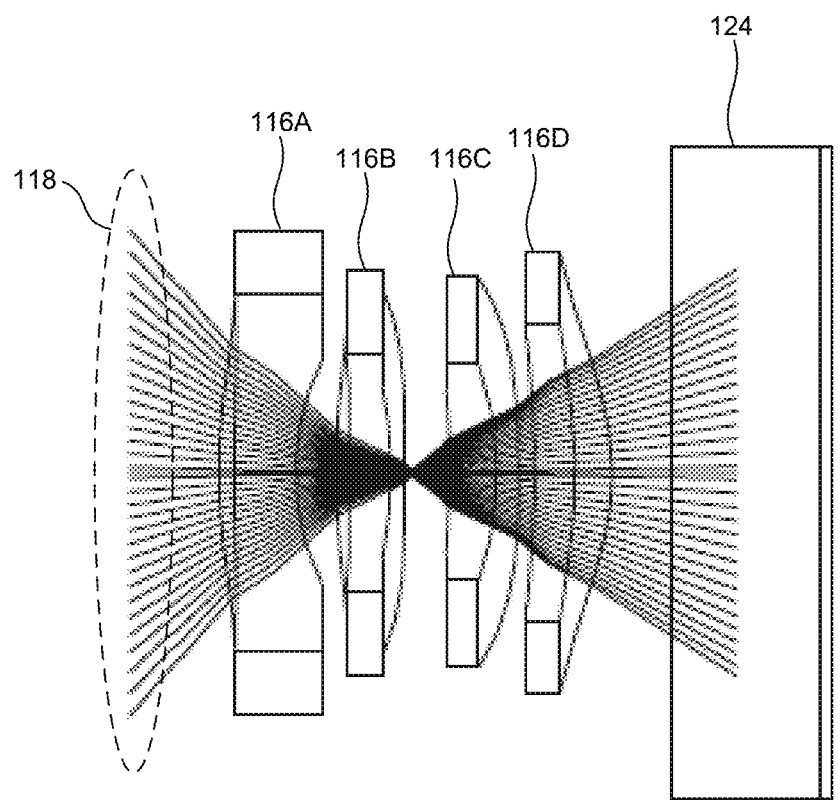
FIG. 4 depicts a view of collection optics 116 of 3-D LIDAR system 100 in greater detail.

FIG. 4 depicts a view of beam shaping optical elements 116 in greater detail. As depicted in FIG. 4, beam shaping optical elements 116 include four lens elements 116A-D arranged to focus collected light 118 onto each detector of the array of integrated LIDAR measurement devices 113. In the embodiment depicted in FIG. 4, light passing through optics 116 is reflected from mirror 124 and is directed onto each detector of the array of integrated LIDAR measurement devices. In some embodiments, one or more of the beam shaping optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 5:
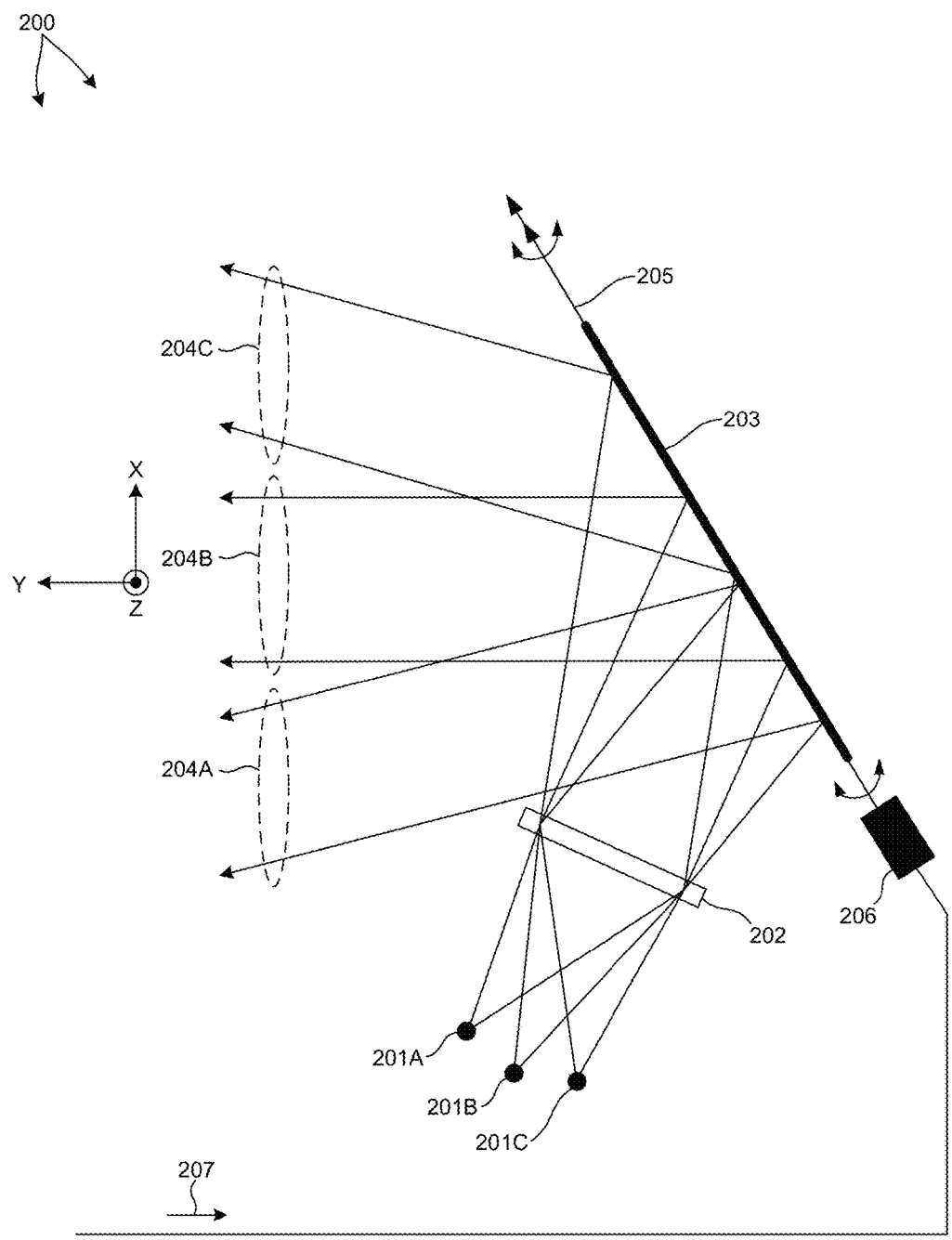
FIG. 5 depicts an embodiment 200 of a 3-D LIDAR system employing a beam scanning device.

FIG. 5 depicts an embodiment 200 of a 3-D LIDAR system employing a beam scanning device. Embodiment 200 includes a one-dimensional array of light sources 201A-C (i.e., an array of light sources aligned in a single plane such as the xy plane depicted in FIG. 5). Each light source is associated with a different LIDAR measurement channel. Light emitted from each light source 201A-C is divergent. These divergent beams pass through beam shaping optics 202 (e.g., collimating optics) where the emitted light is approximately collimated. The term "approximately" collimated is employed to note that in practice, perfect collimation of light beams is rarely achieved. Thus, typically, the resulting beams remain slightly divergent or convergent after passing through beam shaping optics 202. After passing through beam shaping optics 202, each beam reflects from the surface of scanning mirror 203. Scanning mirror 203 is rotated in an oscillatory manner about axis 205 by actuator 206 in accordance with command signals 207 received from a controller (e.g., master controller 190). As depicted in FIG. 5, the reflected beams 204A-C are associated with light sources 201A-C, respectively. Scanning mirror 203 is oriented such that reflected beams 204A-C do not intersect with collimating optics 202, light sources 201A-C, or any other elements of the illumination and detection systems of the 3-D LIDAR system. Furthermore, reflected beams 204A-C maintain their separate trajectories in the x-direction. In this manner, the objects in the environment are interrogated by different beams of illumination light at different locations in the x-direction. In some embodiments, the reflected beams fan out over a range of angles that is less than 40 degrees measured in the x-y plane.

Scanning mirror 203 causes beams 204A-C to sweep in the z-direction (in and out of the drawing depicted in FIG. 5). In some embodiments, the reflected beams scan over a range of angles that is less than 120 degrees measured in the y-z plane.

Figure 6:
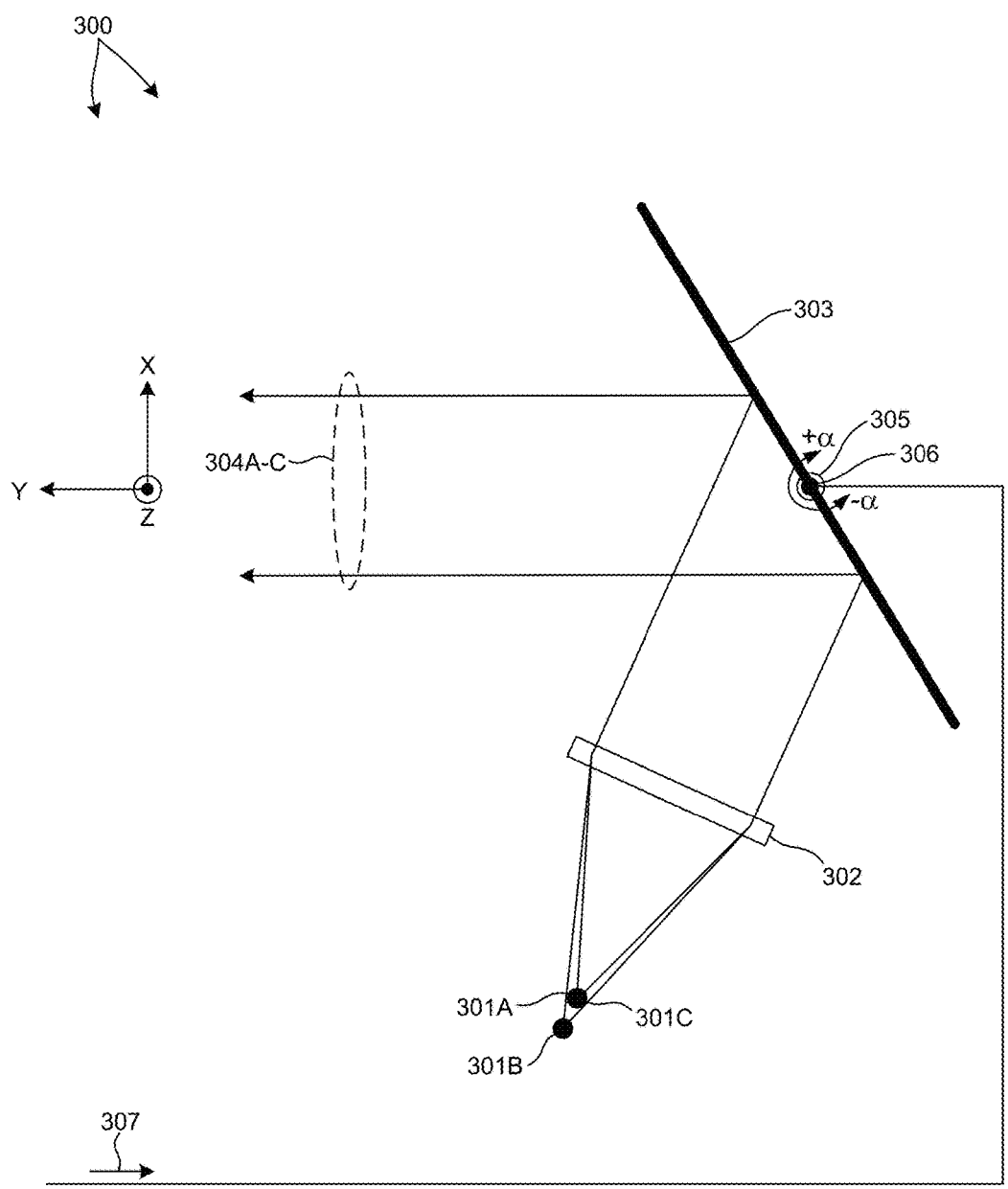
FIG. 6 depicts an embodiment 300 of a 3-D LIDAR system employing a beam scanning device.

FIG. 6 depicts another embodiment 300 of a 3-D LIDAR system employing a beam scanning device. Embodiment 300 includes a one-dimensional array of light sources 301A-C, each associated with a different LIDAR measurement channel. Light sources 301A-C are located in a one dimensional array (i.e., located on a plane parallel to the z-direction; in and out of the drawing depicted in FIG. 6). Light emitted from each light source 301A-C is divergent. These divergent beams pass through beam shaping optics 302 where they are approximately collimated. After passing through beam shaping optics 302, each beam reflects from the surface of scanning mirror 303. The reflected beams 304A-C fan out in the y-z plane (i.e., in and out of the drawing depicted in FIG. 6). Scanning mirror 303 rotates in an oscillatory manner (e.g., within a range of angles between $+\alpha$ and $-\alpha$) about an axis 305 aligned with the surface of scanning mirror 303 and oriented in the z-direction as depicted in FIG. 6. Scanning mirror 203 is rotated in an oscillatory manner about axis 305 by actuator 306 in accordance with command signals 307 received from a controller (e.g., master controller 190). As depicted in FIG. 6, the reflected beams 304A-C are associated with light source 301A-C. Scanning mirror 303 is oriented such that reflected beams 304A-C do not intersect with collimating optics 302, light sources 301A-C, or any other elements of the illumination and detection systems of the 3-D LIDAR system. Furthermore, reflected beams 304A-C maintain their separate trajectories in the z-direction. In this manner, the objects in the environment are interrogated by different beams of illumination light at different locations in the z-direction. In some embodiments, the reflected beams fan out over a range of angles that is less than 40 degrees measured in the y-z plane.

Scanning mirror 303 causes beams 304A-C to sweep in the x-direction. In some embodiments, the reflected beams scan over a range of angles that is less than 120 degrees measured in the x-y plane.

In the embodiment depicted in FIG. 5, each light source of the array of light sources 201A-C is located in a plane. Similarly, in the embodiment depicted in FIG. 6, each light source of the array of light sources 301A-C is located in a plane. This is often referred to as a one-dimensional array of light sources. In the embodiment depicted in FIG. 5, axis 205 of scanning mirror 203 lies in the plane (e.g., the x-y plane) including light sources 201A-C. Similarly, in the embodiment depicted in FIG. 6, axis 305 of scanning mirror 303 lies in the plane including light sources 301A-C. However, in general, the array of light sources may be two dimensional.

Figure 7:
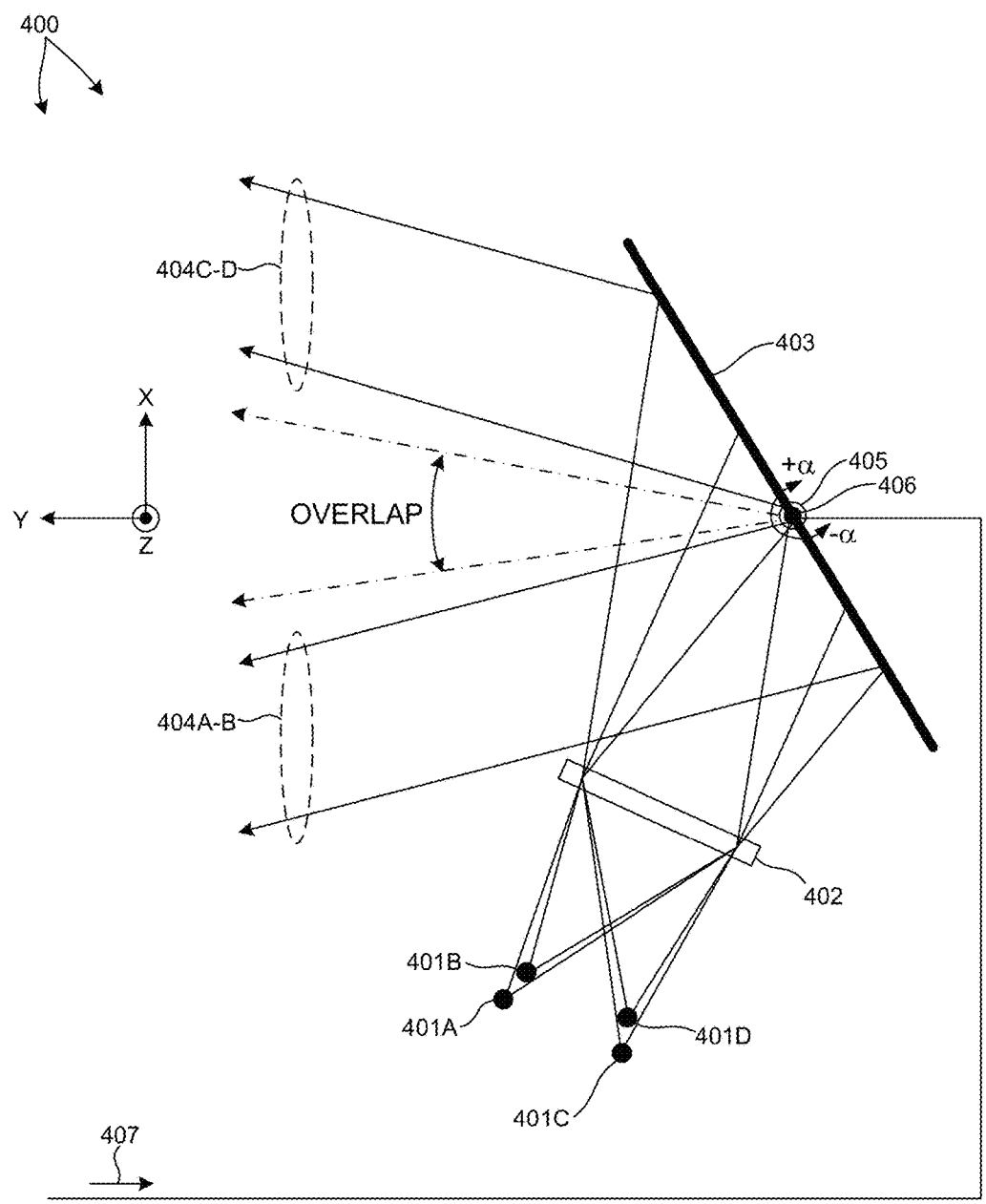
FIG. 7 depicts an embodiment 400 of a 3-D LIDAR system employing a beam scanning device.

FIG. 7 depicts another embodiment 400 of a 3-D LIDAR system. Embodiment 400 includes a two-dimensional array of light sources 401A-D, each associated with a different LIDAR measurement channel. Light sources 401A-B are located in a plane (i.e., located on a plane parallel to the z-direction and light sources 401C-D are located in another plane parallel to the z-direction. In addition, light sources 401A and 401C are located in a plane parallel to the xy plane and light sources 401B and 401D are located in another plane parallel to the xy plane. Light emitted from each light source 401A-D is divergent. These divergent beams pass through beam shaping optics 402 where they are approximately collimated. After passing through beam shaping optics 402, each beam reflects from the surface of scanning mirror 403. The reflected beams 404A-B and reflected beams 404C-D fan out in the y-z plane (i.e., in and out of the drawing depicted in FIG. 7). Scanning mirror 403 rotates in an oscillatory manner (e.g., within a range of angles between +α and −α) about an axis 405 aligned with the surface of scanning mirror 403 and oriented in the z-direction as depicted in FIG. 7. Scanning mirror 403 is rotated in an oscillatory manner about axis 405 by actuator 406 in accordance with command signals 407 received from a controller (e.g., master controller 190). As depicted in FIG. 7, the reflected beams 404A-D are associated with light source 401A-D. Scanning mirror 403 is oriented such that reflected beams 404A-D do not intersect with collimating optics 402, light sources 401A-C, or any other elements of the illumination and detection systems of the 3-D LIDAR system. Furthermore, reflected beams 404A-D maintain their separate trajectories in the z-direction and the x-direction. In this manner, the objects in the environment are interrogated by different beams of illumination light at different locations in the z-direction. In some embodiments, the reflected beams fan out over a range of angles that is less than 40 degrees measured in the y-z plane.

Scanning mirror 403 causes beams 404A-D to sweep in the x-direction. In some embodiments, the reflected beams scan over a range of angles that is less than 120 degrees measured in the x-y plane. In a further aspect, the range of scanning angles is configured such that a portion of the environment interrogated by reflected beams 404A and 404B is also interrogated by reflected beams 404C and 404D, respectively. This is depicted by the angular "overlap" range depicted in FIG. 7. In this manner, the spatial sampling resolution in this portion of the environment is effectively increased because this portion of the environment is being sampled by two different beams at different times.

In another further aspect, the scanning angle approximately tracks a sinusoidal function. As such, the dwell time near the middle of the scan is significantly less than the dwell time near the end of the scan. In this manner, the spatial sampling resolution of the 3D LIDAR system is higher at the ends of the scan.

In the embodiment 400 depicted in FIG. 7, four light sources are arranged in a 2×2 array. However, in general, any number of light sources may be arranged in any suitable manner. In one example, the 2×2 array is tilted with respect to the scanning mirror such that the measurement beams are interlaced in the overlap region.

In another aspect, the light source and detector of each LIDAR measurement channel is moved in two dimensions relative to the beam shaping optics employed to collimate light emitted from the light source. The two dimensional motion is aligned with the optical plane of the beam shaping optic and effectively expands the field of view and increases the sampling density within the field of view of the 3-D LIDAR system.

Figure 8:
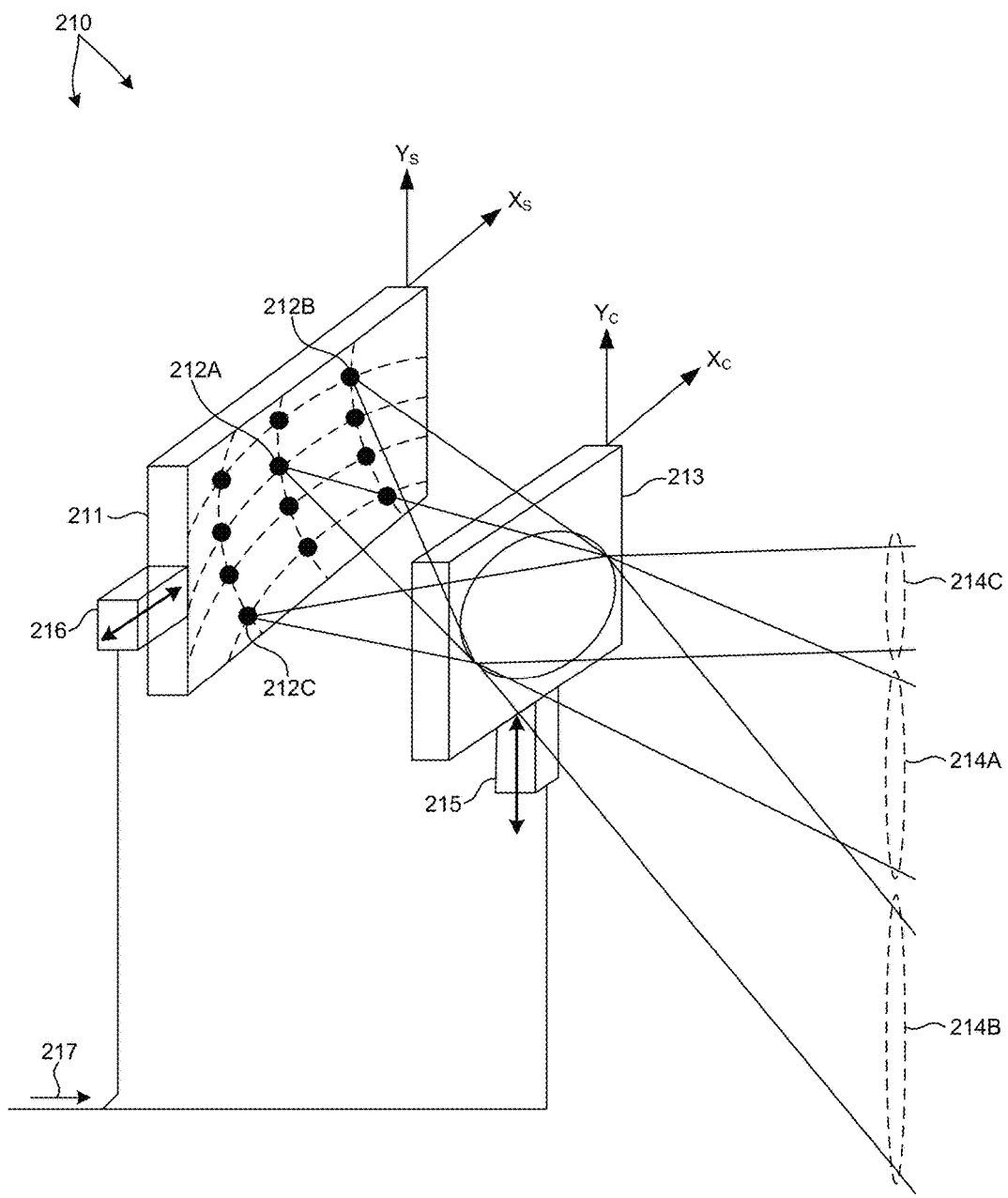
FIG. 8 depicts an embodiment 210 of a 3-D LIDAR system employing a two dimensional array of light sources 211.

FIG. 8 depicts an embodiment 210 of a 3-D LIDAR system employing a two dimensional array of light sources 211, including light sources 212A-C. Light sources 212A-C are each associated with a different LIDAR measurement channel. Light emitted from each light source 212A-C is divergent. These divergent beams pass through beam shaping optics 213 where they are approximately collimated. Collimated beams 214A-C, are each associated with light sources 212A-C, respectively. The collimated beams 214A-C pass on the 3-D environment to be measured. The term "approximately" collimated is employed to note that in practice, perfect collimation of light beams is rarely achieved. Thus, typically, the resulting beams remain slightly divergent or convergent after passing through beam shaping optics 213.

In the depicted embodiment, the two dimensional array of light sources 211 is moved in one direction (e.g., the $X_s$ direction) by actuator 216, and the beam shaping optics 213 are moved in an orthogonal direction (e.g., the $Y_c$ direction) by actuator 215. The relative motion in orthogonal directions between the two dimensional array of light sources 211 and the beam shaping optics 213 effectively scans the collimated beams 214A-C over the 3-D environment to be measured. This effectively expands the field of view and increases the sampling density within the field of view of the 3-D LIDAR system. The two dimensional array of light sources 211 is translated in an oscillatory manner parallel to the $X_s$ by actuator 216 and the beam shaping optic 213 is translated in an oscillatory manner parallel to the $Y_c$ axis in accordance with command signals 217 received from a controller (e.g., master controller 190).

In the embodiment depicted in FIG. 8, the $X_c$-$Y_c$ plane is parallel to the $X_s$-$Y_s$ plane. As depicted in FIG. 8, the source and detector of each LIDAR measurement channel is moved in two dimensions relative to the beam shaping optics employed to collimate light emitted from the light source. The motion of both the two dimensional array of light sources 211 and the beam shaping optics 213 is aligned with the optical plane of the collimating optic (i.e., $X_c$-$Y_c$ plane). In general, the same effect may be achieved by moving the array of light sources 211 in both the $X_s$ and $Y_s$ directions, while keeping collimating optics 213 stationary. Similarly, the same effect may be achieved by moving the beam shaping optics 213 in both the $X_c$ and $Y_c$ directions, while keeping the array of light sources 211 stationary.

In general, the rotations of scanning mirrors 203, 303, 403, and the displacements of the array of light sources 211, beam shaping optics 213, may be realized by any suitable drive system. In one example, flexure mechanisms harmonically driven by electrostatic actuators may be employed to exploit resonant behavior. In another example, an eccentric, rotary mechanism may be employed to transform a rotary motion generated by an rotational actuator into a two-dimensional planar motion. In general, the motion may be generated by any suitable actuator system (e.g., an electromagnetic actuator, a piezo actuator, etc.). In general, the motion may be sinusoidal, pseudorandom, or track any other suitable function.

Figure 9:
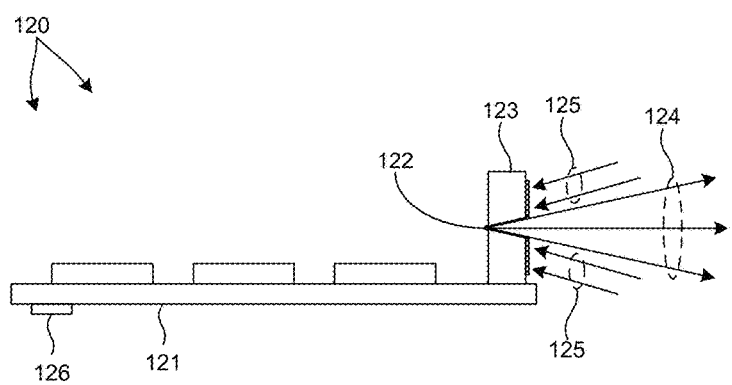
FIG. 9 depicts an integrated LIDAR measurement device 120 in one embodiment.

FIG. 9 depicts an integrated LIDAR measurement device 120 in another embodiment. Integrated LIDAR measurement device 120 includes a pulsed light emitting device 122, a light detecting element 123, associated control and signal conditioning electronics integrated onto a common substrate 121 (e.g., electrical board), and connector 126. Pulsed emitting device 122 generates pulses of illumination light 124 and detector 123 detects collected light 125. Integrated LIDAR measurement device 120 generates digital signals indicative of the distance between the 3-D LIDAR system and an object in the surrounding environment based on a time of flight of light emitted from the integrated LIDAR measurement device 120 and detected by the integrated LIDAR measurement device 120. Integrated LIDAR measurement device 120 is electrically coupled to the 3-D LIDAR system via connector 126. Integrated LIDAR measurement device 120 receives control signals from the 3-D LIDAR system and communicates measurement results to the 3-D LIDAR system over connector 126.

Figure 10:
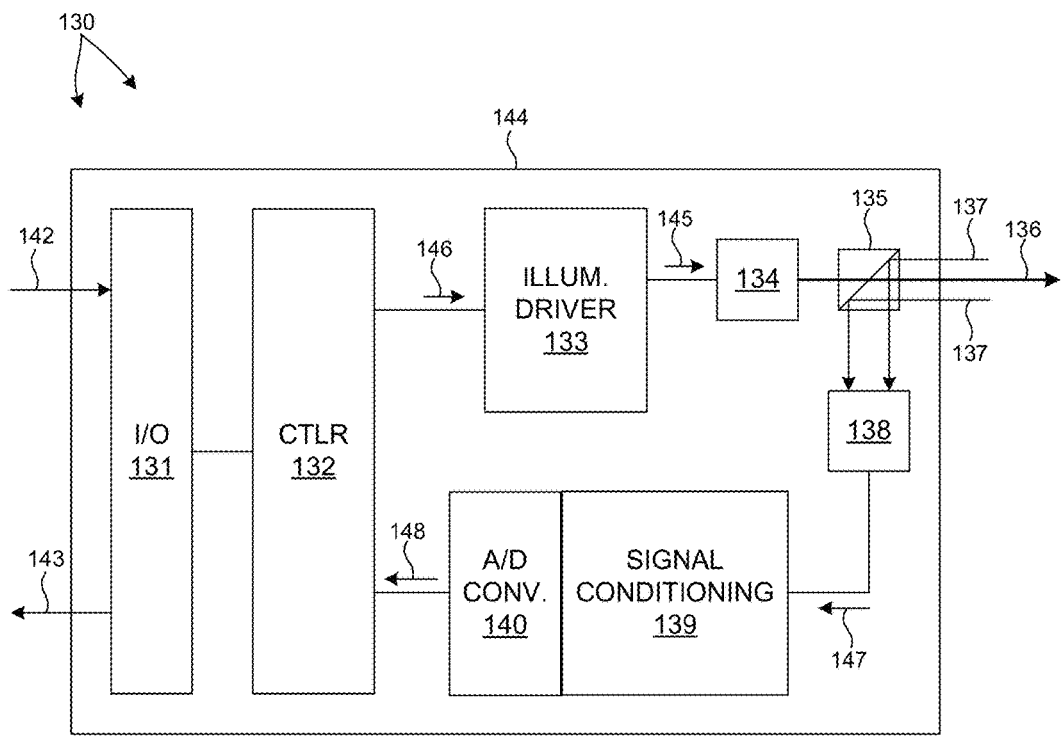
FIG. 10 depicts a schematic view of an integrated LIDAR measurement device 130.

FIG. 10 depicts a schematic view of an integrated LIDAR measurement device 130 in another embodiment. Integrated LIDAR measurement device 130 includes a pulsed light emitting device 134, a light detecting element 138, a beam splitter 135 (e.g., polarizing beam splitter, regular beam splitter, etc.), an illumination driver 133, signal conditioning electronics 139, analog to digital (A/D) conversion electronics 140, controller 132, and digital input/output (I/O) electronics 131 integrated onto a common substrate 144.

As depicted in FIG. 10, a measurement begins with a pulse firing signal 146 generated by controller 132. In some examples, a pulse index signal is determined by controller 132 that is shifted from the pulse firing signal 146 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

Illumination driver 133 generates a pulse electrical current signal 145 in response to pulse firing signal 146. Pulsed light emitting device 134 generates pulsed light emission 136 in response to pulsed electrical current signal 145. The illumination light 136 is focused and projected onto a particular location in the surrounding environment by one or more optical elements of the LIDAR system (not shown).

In some embodiments, the pulsed light emitting device is laser based (e.g., laser diode). In some embodiments, the pulsed illumination sources are based on one or more light emitting diodes. In general, any suitable pulsed illumination source may be contemplated.

As depicted in FIG. 10, return light 137 reflected from the surrounding environment is detected by light detector 138. In some embodiments, light detector 138 is an avalanche photodiode. Light detector 138 generates an output signal 147 that is amplified by signal conditioning electronics 139. In some embodiments, signal conditioning electronics 139 includes an analog trans-impedance amplifier. However, in general, the amplification of output signal 147 may include multiple, amplifier stages. In this sense, an analog transimpedance amplifier is provided by way of non-limiting example, as many other analog signal amplification schemes may be contemplated within the scope of this patent document.

The amplified signal is communicated to A/D converter 140. The digital signals are communicated to controller 132. Controller 132 generates an enable/disable signal employed to control the timing of data acquisition by ADC 140 in concert with pulse firing signal 146.

As depicted in FIG. 10, the illumination light 136 emitted from integrated LIDAR measurement device 130 and the return light 137 directed toward integrated LIDAR measurement device share a common path. In the embodiment depicted in FIG. 10, the return light 137 is separated from the illumination light 136 by a polarizing beam splitter (PBS) 135. PBS 135 could also be a non-polarizing beam splitter, but this generally would result in an additional loss of light. In this embodiment, the light emitted from pulsed light emitting device 134 is polarized such that the illumination light passes through PBS 135. However, return light 137 generally includes a mix of polarizations. Thus, PBS 135 directs a portion of the return light toward detector 138 and a portion of the return light toward pulsed light emitting device 134. In some embodiments, it is desirable to include a quarter waveplate after PBS 135. This is advantageous in situations when the polarization of the return light is not significantly changed by its interaction with the environment. Without the quarter waveplate, the majority of the return light would pass through PBS 135 and be directed toward the pulsed light emitting device 134, which is undesireable. However, with the quarter waveplate, the majority of the return light will pass through PBS 135 and be directed toward detector 138.

In general, a multiple pixel 3-D LIDAR system includes a plurality of LIDAR measurement channels. In some embodiments, a multiple pixel 3-D LIDAR system includes a plurality of integrated LIDAR measurement devices each emitting a pulsed beam of illumination light from the LIDAR device into the surrounding environment and measuring return light reflected from objects in the surrounding environment.

In some embodiments, digital I/O 131, timing logic 132, A/D conversion electronics 140, and signal conditioning electronics 139 are integrated onto a single, silicon-based microelectronic chip. In another embodiment these same elements are integrated into a single gallium-nitride or silicon based circuit that also includes the illumination driver. In some embodiments, the A/D conversion electronics and controller 132 are combined as a time-to-digital converter.

In some embodiments, the time of flight signal analysis is performed by controller 132, entirely. In these embodiments, signals 143 communicated from integrated LIDAR measurement device 130 include an indication of the distances determined by controller 132. In some embodiments, signals 143 include the digital signals 148 generated by A/D converter 140. These raw measurement signals are processed further by one or more processors located on board the 3-D LIDAR system, or external to the 3-D LIDAR system to arrive at a measurement of distance. In some embodiments, controller 132 performs preliminary signal processing steps on signals 148 and signals 143 include processed data that is further processed by one or more processors located on board the 3-D LIDAR system, or external to the 3-D LIDAR system to arrive at a measurement of distance.

In some embodiments a 3-D LIDAR system includes multiple integrated LIDAR measurement devices. In some embodiments, a delay time is set between the firing of each integrated LIDAR measurement device. Signal 142 includes an indication of the delay time associated with the firing of integrated LIDAR measurement device 130. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

Figure 11:
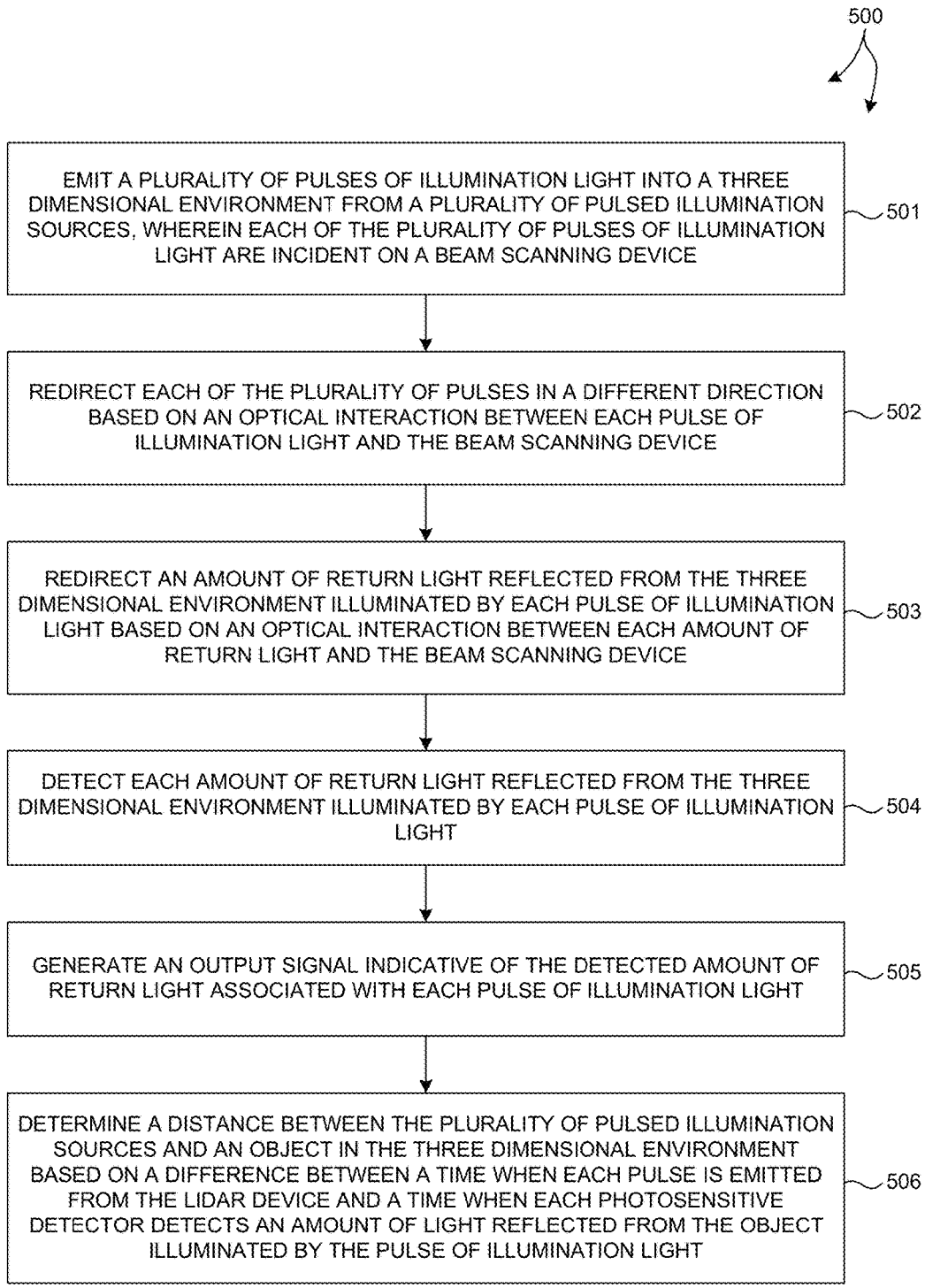
FIG. 11 depicts a flowchart illustrative of a method 500 of performing multiple LIDAR measurements based on scanning measurement beams in at least one novel aspect.

FIG. 11 illustrates a flowchart of a method 500 suitable for implementation by a LIDAR system as described herein. In some embodiments, LIDAR system 100 is operable in accordance with method 500 illustrated in FIG. 11. However, in general, the execution of method 500 is not limited to the embodiments of LIDAR system 100 described with reference to FIG. 1. These illustrations and corresponding explanation are provided by way of example as many other embodiments and operational examples may be contemplated.

In block 501, a plurality of pulses of illumination light are emitted into a three dimensional environment from a plurality of pulsed illumination sources. Each of the plurality of pulses of illumination light are incident on a beam scanning device.

In block 502, each of the plurality of pulses is redirected in a different direction based on an optical interaction between each pulse of illumination light and the beam scanning device.

In block 503, an amount of return light reflected from the three dimensional environment illuminated by each pulse of illumination light is redirected based on an optical interaction between each amount of return light and the beam scanning device.

In block 504, each amount of return light reflected from the three dimensional environment illuminated by each pulse of illumination light is detected (e.g., by a photosensitive detector).

In block 505, an output signal indicative of the detected amount of return light associated with each pulse of illumination light is generated.

In block 506, a distance between the plurality of pulsed illumination sources and an object in the three dimensional environment is determined based on a difference between a time when each pulse is emitted from the LIDAR device and a time when each photosensitive detector detects an amount of light reflected from the object illuminated by the pulse of illumination light.

Master controller 190 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 192 implementing methods such as those described herein may be transmitted over a transmission medium such as a wire, cable, or wireless transmission link. For example, as illustrated in FIG. 1, program instructions 192 stored in memory 191 are transmitted to processor 195 over bus 194. Program instructions 192 are stored in a computer readable medium (e.g., memory 191). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:
   a plurality of pulsed illumination sources each emitting a pulse of illumination light from the LIDAR device in different directions into a three dimensional environment;
   a plurality of photosensitive detectors each detecting an amount of return light reflected from the three dimensional environment illuminated by each pulse of illumination light and generating an output signal indicative of the detected amount of return light associated with each pulse of illumination light;
   a beam scanning device disposed in an optical path between the plurality of pulsed illumination sources and the three dimensional environment under measurement and between the plurality of photosensitive detectors and the three dimensional environment under measurement, the beam scanning device configured to redirect each pulse of illumination light with respect to each of the plurality of pulse illumination sources and each of the plurality of photosensitive detectors in response to a command signal; and
   a computing system configured to:
      receive each output signal indicative of the detected amount of light; and
      determine a distance between the LIDAR device and an object in the three dimensional environment based on a difference between a time when each pulse is emitted from the LIDAR device and a time when each photosensitive detector detects an amount of light reflected from the object illuminated by the pulse of illumination light.

2. The LIDAR device of claim 1, further comprising:
   one or more beam shaping optical elements disposed in the optical path between the beam scanning device and the plurality of pulsed illumination sources and between the beam scanning device and the plurality of photosensitive elements.

3. The LIDAR device of claim 1, wherein the beam scanning device includes one or more beam shaping optical elements.

4. The LIDAR device of claim 1, wherein a first range of the three dimensional environment measured by a sequence of pulses of illumination light emitted by a first pulsed illumination source of the plurality of pulsed illumination sources light and scanned over the first range by the beam scanning device spatially overlaps a second range of the three dimensional environment measured by a sequence of pulses of illumination light emitted by a second pulsed illumination source of the plurality of pulsed illumination sources light and scanned over the second range by the beam scanning device.

5. The LIDAR device of claim 1, wherein the beam scanning device includes a mirror element rotated by an actuator about an axis of rotation.

6. The LIDAR device of claim 5, wherein the mirror element is rotated about that axis of rotation with an oscillatory angular velocity.

7. The LIDAR device of claim 6, wherein the oscillatory angular velocity tracks a sinusoidal profile.

8. The LIDAR device of claim 5, wherein the plurality of pulsed illumination sources are disposed in a plane parallel to the axis of rotation.

9. The LIDAR device of claim 5, wherein the plurality of pulsed illumination sources are disposed in a plane perpendicular to the axis of rotation.

10. The LIDAR device of claim 3, wherein the one or more beam shaping optical elements are translated in a first direction parallel to an optical plane of the one or more beam shaping optical elements.

11. The LIDAR device of claim 10, wherein the plurality of pulsed illumination sources are translated in a second direction parallel to the optical plane of the one or more beam shaping elements, wherein the first and second directions are different directions.

12. The LIDAR device of claim 1, wherein the command signal is generated by the computing system.

13. A light detection and ranging (LIDAR) device, comprising:
   a plurality of pulsed illumination sources each emitting a pulse of illumination light from the LIDAR device in different directions into a three dimensional environment;
   a plurality of photosensitive detectors each detecting an amount of return light reflected from the three dimensional environment illuminated by each pulse of illumination light and generating an output signal indicative of the detected amount of return light associated with each pulse of illumination light;
   a beam scanning device disposed in an optical path between the plurality of pulsed illumination sources and the three dimensional environment under measurement and between the plurality of photosensitive detectors and the three dimensional environment under measurement, the beam scanning device configured to redirect each pulse of illumination light with respect to each of the plurality of pulse illumination sources and each of the plurality of photosensitive detectors in response to a command signal; and
   a non-transient computer-readable medium comprising computer-readable instructions that when read by a computing system cause the computing system to:
      receive each output signal indicative of the detected amount of light; and
      determine a distance between the LIDAR device and an object in the three dimensional environment based on a difference between a time when each pulse is emitted from the LIDAR device and a time when each photosensitive detector detects an amount of light reflected from the object illuminated by the pulse of illumination light.

14. The LIDAR device of claim 13, further comprising:
   one or more beam shaping optical elements disposed in the optical path between the beam scanning device and the plurality of pulsed illumination sources and between the beam scanning device and the plurality of photosensitive elements.

15. The LIDAR device of claim 13, wherein the beam scanning device includes one or more beam shaping optical elements.

16. The LIDAR device of claim 13, wherein a first range of the three dimensional environment measured by a sequence of pulses of illumination light emitted by a first pulsed illumination source of the plurality of pulsed illumination sources light and scanned over the first range by the beam scanning device spatially overlaps a second range of the three dimensional environment measured by a sequence of pulses of illumination light emitted by a second pulsed illumination source of the plurality of pulsed illumination sources light and scanned over the second range by the beam scanning device.

17. The LIDAR device of claim 13, wherein the beam scanning device includes a mirror element rotated by an actuator about an axis of rotation.

18. The LIDAR device of claim 15, wherein the one or more beam shaping optical elements are translated in a first direction parallel to an optical plane of the one or more beam shaping optical elements, and wherein the plurality of pulsed illumination sources are translated in a second direction parallel to the optical plane of the one or more beam shaping elements, wherein the first and second directions are different directions.

19. A method comprising:
   emitting a plurality of pulses of illumination light into a three dimensional environment from a plurality of pulsed illumination sources, wherein each of the plurality of pulses of illumination light are incident on a beam scanning device;
   redirecting each of the plurality of pulses in a different direction with respect to each of the plurality of pulse illumination sources in response to a command signal communicated to the beam scanning device based on an optical interaction between each pulse of illumination light and the beam scanning device;
   redirecting an amount of return light reflected from the three dimensional environment illuminated by each pulse of illumination light based on an optical interaction between each amount of return light and the beam scanning device;
   detecting each amount of return light reflected from the three dimensional environment illuminated by each pulse of illumination light;
   generating an output signal indicative of the detected amount of return light associated with each pulse of illumination light; and
   determining a distance between the plurality of pulsed illumination sources and an object in the three dimensional environment based on a difference between a time when each pulse is emitted from the LIDAR device and a time when each photosensitive detector detects an amount of light reflected from the object illuminated by the pulse of illumination light.

20. The method of claim 19, wherein the redirecting of each of the plurality of pulses and the redirecting of each amount of return light reflected from the three dimensional environment involves a mirror element rotated by an actuator about an axis of rotation.

* * * * *